United States Patent [19]

Miller

[11] Patent Number: 5,117,351
[45] Date of Patent: May 26, 1992

[54] OBJECT IDENTIFIER GENERATOR FOR DISTRIBUTED COMPUTER SYSTEM

[75] Inventor: Steven Miller, Newton, Mass.

[73] Assignee: Digital Equipment Corporation, Maynard, Mass.

[21] Appl. No.: 260,908

[22] Filed: Oct. 21, 1988

[51] Int. Cl.[5] .............................................. G06F 1/02
[52] U.S. Cl. ...................................... 395/650; 364/237.6; 364/271.9; 364/DIG. 1
[58] Field of Search ... 364/200 MS File, 900 MS File

[56] References Cited

U.S. PATENT DOCUMENTS

| | | | |
|---|---|---|---|
| 4,558,413 | 12/1985 | Schmidt et al. | 364/200 |
| 4,597,057 | 6/1986 | Snow | 364/900 |
| 4,792,921 | 12/1988 | Corwin | 364/900 |

*Primary Examiner*—David Y. Eng
*Attorney, Agent, or Firm*—Nutter, McClennen & Fish

[57] ABSTRACT

An identifier generator produces unique identifiers for objects in a distributed computer system by concatenating (i) the identifier of the node associated with the object—a unique space component; (ii) the current time read from an associated clock, adjusted such that no two identifiers created by the same generator have the same current time, regardless of the resolution of the associated clock—a unique time component; and (iii) a random name-sequence; and (iv) a (software/hardware) version number. The generator stores the time and the random name-sequence components. When the next identifier is generated, the generator compares the then current time with the stored time component. If the times are equal, the current time is adjusted and the adjusted time is used as the new identifier time component. If the current time is less than the stored time, the generator changes the stored random name-sequence component and uses it and the current time as identifier components. If the random name sequence component used in the previous identifier is lost, the generator generates a new random name sequence and uses the new sequence and the then current time as identifier components. If the time component used in the previous identifier is lost, the generator changes the random name-sequence is a predetermined manner and uses it and the then current time as identifier components.

15 Claims, 4 Drawing Sheets

OBJECT IDENTIFIER GENERATOR FOR DISTRIBUTED COMPUTER SYSTEM

FIELD OF INVENTION

The invention relates generally to distributed computer systems and more particularly to the unique labeling of objects, processes, events and/or entities within the system.

BACKGROUND OF THE INVENTION

Distributed computer systems are made up of a number of communicating nodes. The nodes connect various devices, such as processors, mass storage devices, printers, terminals, etc., to the computer system. The devices may communicate with each other, through the nodes, regardless of the physical proximity of the devices and/or the nodes. Nodes located relatively close together may communicate over a local area network. Nodes located some distance apart may communicate over other communications lines, such as telephone lines.

The nodes, as well as the connected devices and associated processes, data bases and other (logical) objects, collectively referred to herein as objects, must be uniquely labeled or named such that the objects can be positively identified throughout the entire distributed system. Otherwise, communications meant for a particular object may be sent to the wrong object and thus lost, or data may be deleted from or added to the wrong object due to a mistaken identity.

In a distributed system a centralized label-generator may be used to ensure that each object is given a unique label, commonly referred to as an identifier. Every time an identifier is required, a request for one is sent over the network communication lines to the central generator, and the generator formulates and returns an identifier for the object. Communication line availability, for sending the request to the generator and returning the generated identifier to the object, or the availability of the generator, may limit the availability of the identifiers and may cause delays. Various objects may require the generation of identifiers relatively quickly, or even simultaneously. Thus using a central generator and waiting for the return of an identifier, even with communication lines that are immediately available, may cause delays.

To avoid such delays and ensure more robust identifier availability, a number of decentralized generators may be used. The decentralized generators are capable of simultaneously generating identifiers. However, some method of ensuring that the generated identifiers are unique throughout the entire system must be used.

One such method requires communication between the generators such that each generator is "informed" of the identifiers already assigned. Delays and limitations similar to those arising from using a centralized generator may result each time the generators communicate.

In another method, identifiers are created by concatenating the identifier of the nodes associated with the objects and the then current time read from a clock associated with the node. Identifiers created simultaneously for objects associated with different nodes will thus differ at least by the node identifiers, and identifiers created for objects associated with the same node at different times will differ by the difference in the current time. Thus the generators using this method for creating identifiers need not communicate.

Delays in creating identifiers may still be experienced, however, when a particular generator is instructed to generate identifiers at a rate which is faster than the resolution of the associated node clock. If the generator generates the identifiers without a delay, duplicate identifiers will be generated. Thus a method of generating unique identifiers at a rate which is faster than the resolution of the associated node clock is desirable.

Duplicate identifiers may also be created using this method when the clocks are re-set, for example, during a system re-boot. If the node clocks are set to times preceding their previous current times, identifiers generated thereafter may be duplicates of earlier ones. Similarly, if the system is re-configured, a node may become newly associated with a clock which is operating behind the time of the previously associated clock, and duplicate identifiers may be created. Thus a decentralized generating method which produces unique identifiers regardless of changes in associated clocks and/or system configuration is desirable.

SUMMARY OF INVENTION

The invention is an improved identifier generator which produces object identifiers which are unique in both space and time. In brief summary, to generate an identifier the unique identifier (UID) generator concatenates (i) the identifier of the node associated with the object—the unique space component; (ii) the current time, adjusted such that identifiers created simultaneously by the same generator will have different current times, regardless of the resolution of the associated clock—the unique time component; and (iii) a random name-sequence; and (iv) a (software/hardware) version number.

When a new identifier is generated, the generator stores the current time component, adjusted as necessary, and the random name-sequence component. When the generator generates the next identifier, it compares the stored time component of the last identifier with the then current time. If the times are the same, the UID-generator adjusts the current time using a time adjustment factor, incremented as necessary. The UID-generator also checks whether or not the associated clock has lost the current time at any time after the generation of the previous identifier. If the clock has lost the time the UID-generator changes the random name-sequence. Thus even if a later generated identifier has a time component which is a duplicate of some earlier identifier, for example, if the associated clock is improperly re-set, the identifiers are still unique because they do not contain the same random name-sequence.

If the random name-sequence used in the previous identifier is lost, the UID-generator formulates another random name-sequence. Each random name-sequence is truly random, not pseudo-random, reducing the probability of formulating a duplicate name-sequence.

The identifier also includes the version number of the hardware/software used by the generator. This ensures that the identifier will be deciphered as an identifier by future generations of system nodes and objects and/or future operating systems which may use completely different schemes to generate identifiers.

BRIEF DESCRIPTION OF THE DRAWINGS

For a more complete understanding of the features, advantages, and objects of the invention, reference should be made to the following detailed description and the accompanying drawings, in which.

DETAILED DESCRIPTION

Figure 1:
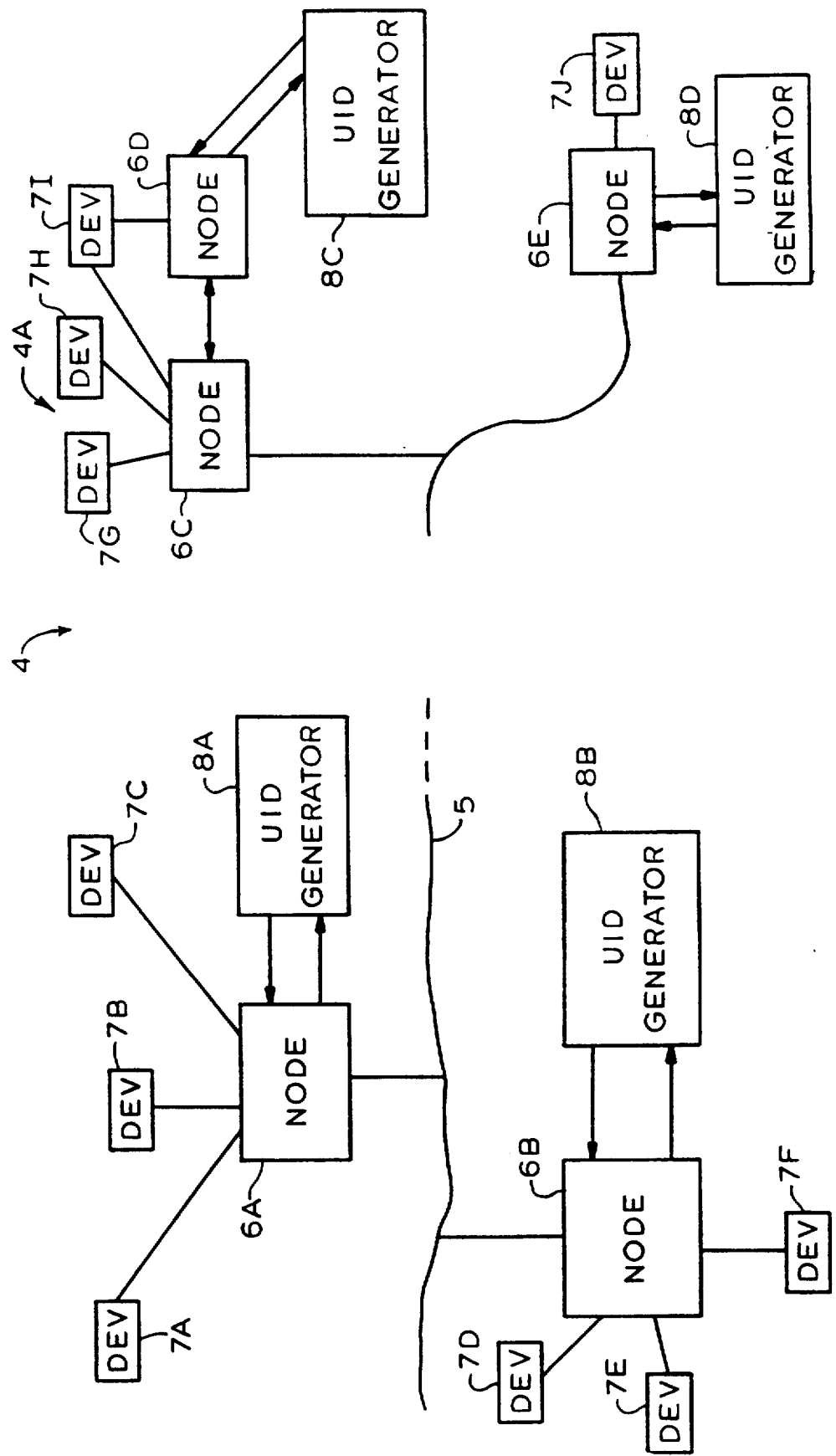
FIG. 1 illustrates a distributed computer system.

With reference to FIG. 1, a distributed computer system 4 includes a plurality of nodes 6A–6E. Each node has attached to it one or more devices 7A–7J. The devices 7 may be of diverse types, including host computers, mass storage devices, telecommunications links, printers, and so forth, all of which may transmit information to, or receive information from, other devices in the distributed system through their respective nodes.

Nodes 6A and 6B are connected to a network 5, and thus device 7A may communicate with device 7E through node 6A which transmits information over network 5 to node 6B. Device 7A may also communicate with device 7G by transferring information through node 6A to node 6C. These nodes may communicate by, for example, telephone lines.

Nodes 6C and 6D each attach device 7I to the distributed system. Device 7I may be capable of communicating with various other system devices 7 through dual ports, and thus it is serviced by two nodes. Nodes 6C and 6D, together with their attached devices, form a subsystem 4A.

ach node and/or subsystem has assigned to it a unique identifier (UID) generator 8. Each UID-generator 8 generates object identifiers for objects associated with its assigned node and/or subsystem. The operation of the UID-generator 8 will be discussed in more detail with reference to FIGS. 3 and 4 below.

Figure 2:
FIG. 2 depicts an identifier constructed in accordance with a preferred embodiment of the invention.

FIG. 2 illustrates the format of the identifiers generated by the UID-generator 8 in the preferred embodiment. An identifier 9 includes a time component 9A, a hardware/software version number component 9B, a random name-sequence component 9C and a node identification component 9D. It will be understood by those skilled in the art that the format of the identifier may be altered as long as each component is present in the identifier.

The time component 9A is the current time read from a clock associated with the UID-generator 8 adjusted, if necessary, as described below with reference to FIGS. 3 and 4. In the preferred embodiment, the current time representation is universal time coordinated time (UTC), for example, Greenwich Mean Time. The time component thus includes the date—day, month, and year—and the time in hours, minutes, seconds and fractions of seconds. The current time representation may be any time representation which is standard throughout the network.

The version number 9B identifies the version of software/hardware used by the UID-generator 8 in generating the identifier. When the software/hardware is updated, the version number is also updated. Thereafter, the identifier can be readily deciphered, for example, the time component of the identifier can be discerned, even if the format of succeeding identifiers changes.

The random name-sequence component 9C is a truly random number, not a pseudo-random number. It is included in the identifier to substantially reduce the probability that two identifiers will be duplicates if the node is associated, through a system re-configuration or re-boot, with a clock which is running behind the time of the clock previously associated with the node. The random name-sequence component is discussed in more detail with reference to FIGS. 3 and 4 below.

The node identifier component 9D is the unique identifier assigned to the particular node associated with the UID-generator 8. Each node is ordinarily assigned an identifier by the manufacturer/assembler of the node hardware. For example, each manufacturer may be allocated a unique range of identifiers by the Institute of Electrical and Electronics Engineers, Inc. (IEEE), and thus, the node identifier is one of these IEEE identifiers. If a node does not have an identifier, conventional node assignment methods, for example, distribution of node identifiers by the network administrator, may be used to assign it a unique node identifier.

A sub-system may contain more than one node, which means that more than one node identifier may be associated with the sub-system. Thus a single node identifier is selected for use in the subsystem's UID-generator 8.

Figure 3:
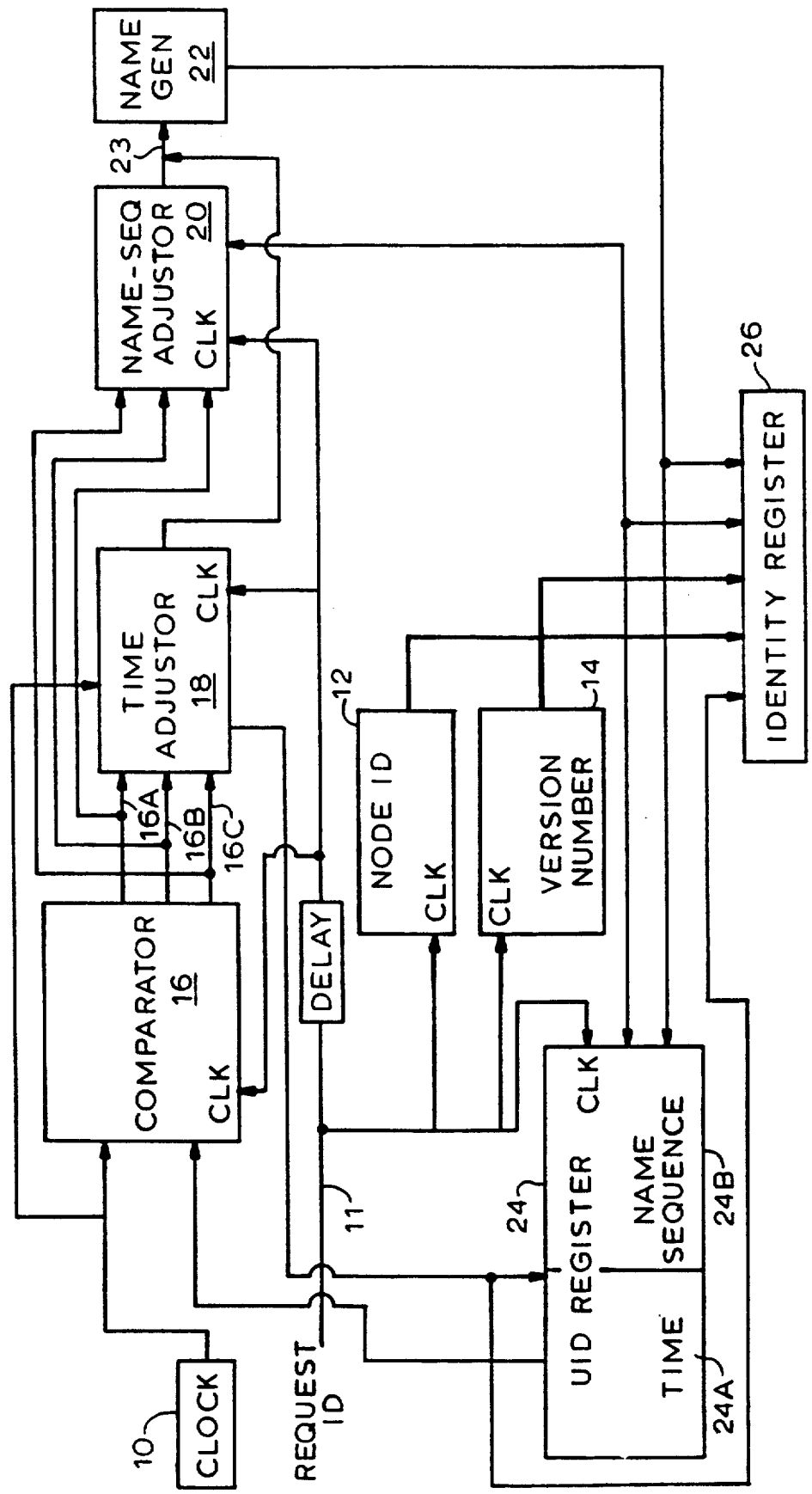
FIG. 3 is an illustration of a UID-generator constructed in accordance with the preferred embodiment.
Figure 4:
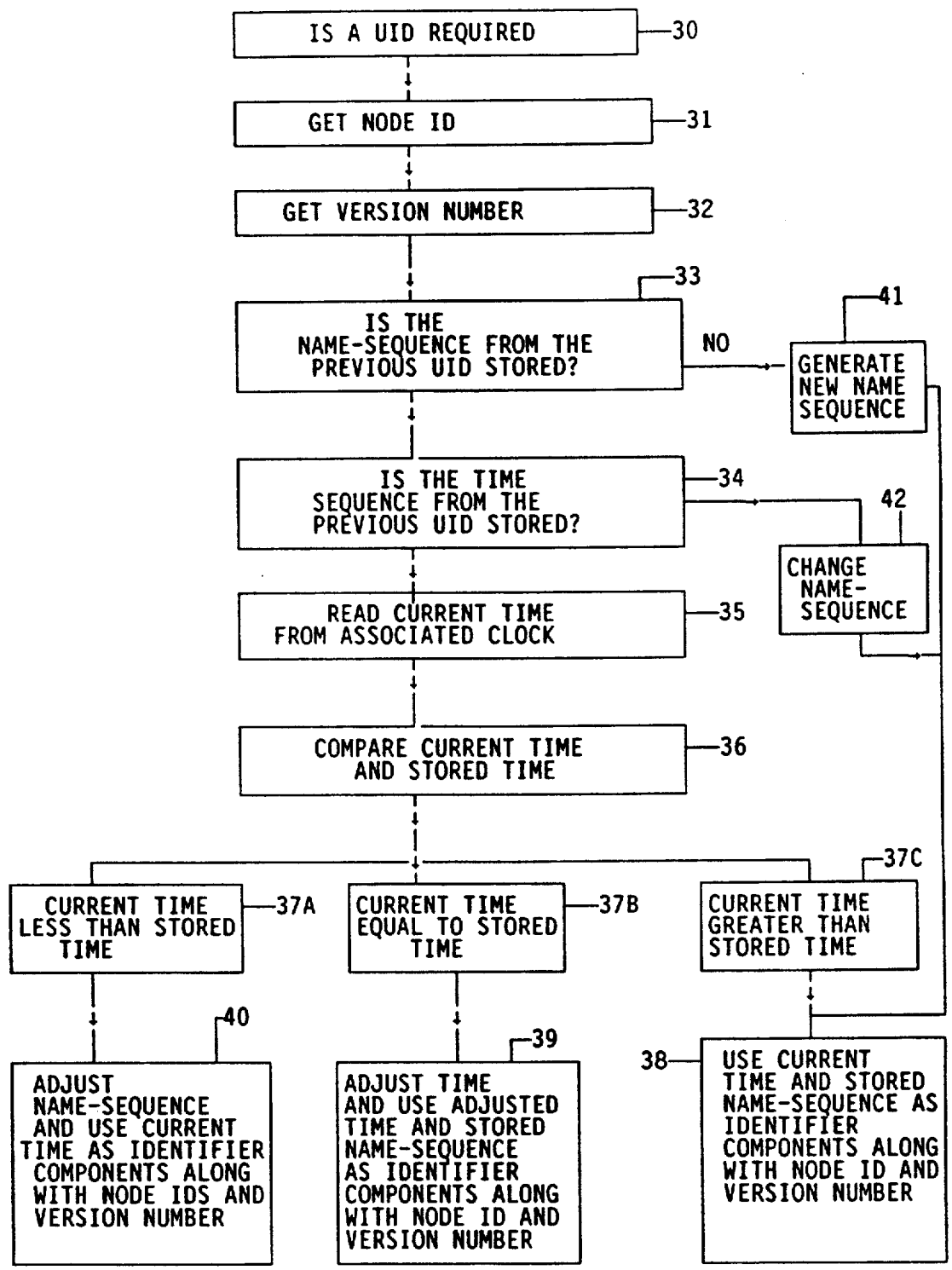
FIG. 4 is a flow chart of the operation of the UID-generator operating in accordance with the preferred embodiment.

With reference to FIGS. 3 and 4, a UID-generator 8 includes a node-id register 12 and a version-number register 14, each appropriately initialized, a comparator 16, a time adjuster 18, a name-sequence adjuster 20, a random name-sequence generator 22, a UID-register 24, and an identifier-register 26. The UID-register 24 is divided into two sections, namely, a time section 24A and a name section 24B. It holds the time and name-sequence components 9A and 9C (FIG. 2) of the previous identifier generated by UID-generator 8. The identity-register 26 holds the identifier generated by the UID-generator 8.

The node-id register 12 contains a copy of the identifier assigned to the node or the node identifier selected for the associated subsystem. The version-number register 14 contains the version number of the software/hardware used by the UID-generator 8 in generating the identifier as discussed above.

When an identifier is required, a REQUEST ID signal is asserted on line 11 by, for example, the network operating system (step 30) The asserted REQUEST ID signal on line 11 clocks the UID-register 2 and the contents of the time section 24A and the name section 24B are transferred to the comparator 16 and the name-sequence adjuster 20, respectively (steps 33–34). The node-id register 12 and the version-number register 14 are also clocked by the asserted REQUEST ID signal on line 11, and their contents transferred to the identifier-register 26 and stored therein (steps 31–32).

The comparator 16, which is clocked by a slightly delayed REQUEST ID signal, compares the then current time read from an associated clock 10 with the time component of the previously generated identifier (steps 35–36). The current time is also stored in the time adjuster 18, which is similarly clocked by the delayed REQUEST ID signal.

The output of the comparator 16 is applied over lines 16A–C to the time adjuster 18 and the name-sequence adjuster 20. If the current time is later than the time retrieved from the UID-register 24, that is, the binary representation of the current time is greater than the time component of the previous identifier, the comparator 16 asserts a GREATER THAN signal over line 16A (step 37C).

In response to this signal, the time adjuster 18 transfers the stored current time, without alteration, to the UID-register 24 and the identity register 26. The name-sequence stored in the name adjuster is also transferred, without alteration, to the UID-register 24 and the identifier-register 26 (step 38). The identifier-register 26 then contains a complete object identifier which can be assigned to the appropriate object. The UID-register 24 contains the time and name-sequence components 9A and 9C (FIG. 2) of the identifier which are used in generating the next identifier.

If the times compared in comparator 16 are equal (step 37B) indicating that identifiers are required at a rate which is faster than the resolution of the associated clock 10, an EQUAL signal is asserted on line 16B. In response to the EQUAL signal, the time adjuster 16 adjusts, or alters, a number of least significant bits of the then current time (step 39).

The time is altered by adding a predetermined bit-sequence to the time. The current time may be adjusted a number of times. If the next identifier also requires a time adjustment, a second predetermined sequence is added to the time. The current identifier will thus not have the same time component as the previously generated identifier. However, if too many identifiers are requested too quickly, some delay will be introduced. The number of identifiers which may be created without delay depends on the resolution of the associated clock.

The adjusted time is then transferred to the UID-register 24 and the identity-register 26. The name-sequence is also transferred to the registers 24 and 26, without alteration, and the complete identifier is then contained in the identity-register 26 (step 39).

If the current time precedes the stored time, it indicates that the clock has lost time since the generation of the preceding identifier, for example, due to a system reconfiguration which associates the node, and thus the UID-generator 8, with a slower clock. The comparator asserts a LESS THAN signal on line 16C, and the signal is applied to both the time adjuster 18 and the name-sequence adjustor 20 (step 37A).

In response to the LESS THAN signal, the name-sequence adjuster 20 changes the random name-sequence which was earlier retrieved from the UID-register 24 (step 40). This ensures that the current identifier will not contain the same random name-sequence as the previous identifier, and presumably not contain the same name-sequence as any other identifier generated by the UID-generator 8. Thus even if a subsequent identifier has the same time component as a previously generated identifier, it does not have the same random name-sequence, and the identifiers are unique. In the preferred embodiment the name-sequence is changed by incrementing it. This reduces the probability that the random name-sequence will be identical to a later generated sequence.

Adjusting the random name-sequence protects against duplicate identifiers, without having to compare the current identifier with each earlier generated identifier. For example, with a non-monotonic clock, that is, a clock which is running behind the clock previously associated with the node, a subsequent identifier may have a time component which is a duplicate of an earlier identifier, but not necessarily the immediately preceding identifier. Such a situation may not trigger any time adjustments, however, if the identifier is compared only with its previous identifier. Thus comparisons would have to be made with all previously generated identifiers to avoid duplicates if the random name-sequence is not adjusted when the clock is "backward".

After the name adjuster 20 adjusts the random name-sequence, it transfers the name-sequence to both the UID-register 24 and the identifier register 26. The time adjuster 18 also transfers the stored current time to the identity-register 26 and the UID-register 24, without adjustment. The identifier-register 26 then contains the complete object identifier, and the UID-register 24 contains the components used in generating the next identifier.

If the current time component 9A (FIG. 2) used in the previous identifier is lost, for example, due to a system re-boot which clears the UID-register time section 24A, the random name-sequence 9C (FIG. 2) is changed; it is incremented in the preferred embodiment (steps 34,42). The name-sequence adjuster 20 is energized by a control signal from the comparator 16 when it is unable to retrieve the time from the UID-register 24. The name-sequence adjuster 20 then changes the random name-sequence 9C in a predetermined manner. It will be appreciated by those skilled in the art that a new random name-sequence may be generated each time the previous time component 9A is lost, thus eliminating the need for the name sequence adjustor 20.

If the name-sequence component 9C used in the previous identifier is lost, a new random name-sequence is generated in the name-sequence generator 22 (steps 33, 41). The name-sequence generator 22 is energized by a control signal asserted on line 23 by the name adjustor 20 when it is unable to retrieve the name-sequence from the UID-register 24. Generating a new random name-sequence 9C thus allows the current time then stored in the time adjustor 18 to be used without alteration in the current identifier.

The name-sequence generator 20, which is a truly random number generator as opposed to a pseudo-random number generator, is of conventional design. The generator 22 may generate a pseudo-random number and add to it a number selected at random, for example, a number representing some non-uniform system noise, to create a truly random number if the generator 22 is capable only of internally generating a pseudo-random number.

Once generated, the random name-sequence is transferred to the UID-register 24 and the identity register 26. The current time stored in the time adjustor 18 is also transferred to the registers 26 and 24 (step 43), and the complete object identifier is then contained in the identity-register 26.

It will be appreciated by those skilled in the art that the identifiers may be generated using hardware, software, or firmware, or any combination thereof. The UID-generator 8 is capable of generating unique identifiers quickly, at a faster rate than the resolution of the associated clock and even simultaneously if required. The identifiers are unique, regardless of system reconfiguration and/or system re-boot, due to including a unique space component, a unique time component and a truly random component. Thus duplicate identifiers which can cause a distributed system many problems, including lost data and/or objects, are essentially eliminated.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A device for generating identifiers for objects in a computer system, said device comprising:
    A. a clock for designating the current time;
    B. means for generating a random number sequence;
    C. a first storage means for storing the time and the random number sequence components of a generated identifier, the contents of said storage means being updated after each identifier is generated;
    D. a comparator for comparing the current time read from said clock and the time stored in said storage means;
    E. time adjusting means connected to receive the current time from said clock and responsive to the output of said comparator for adjusting the current time if the current time and the stored time are equal;
    F. sequence adjusting means connected to receive the random number sequence from said first storage means and responsive to the output of said comparator for adjusting said stored random number sequence if the current time is less than the stored time; and
    G. a second storage means responsive to the output of said time adjusting means and the output of said sequence adjusting means for storing said outputs as components of the current identifier wherein said current time represents days, months, years, hours, minutes, seconds and fractions of seconds.

2. The device of claim 1, wherein said random number sequence generator generates a new random number sequence if said first storage means does not contain a random number sequence.

3. The device of claim 2, wherein said sequence adjusting means adjusts said stored random number sequence if said first storage means does not contain the time.

4. The device of claim 3, wherein said device further comprises a node identifier means for providing the identifier of a node associated with the object to said second storage means, said second storage means storing the contents of said node identifier means as a component of the identifier.

5. The device of claim 4, wherein said device further comprises a version number storage means for providing a version number of hardware or software used in generating the identifier to said second storage means, said second storage means storing the contents of said version number storage means as a component of the identifier.

6. A device for generating identifiers for objects in a computer system, said device comprising:
    A. a clock for designating the current time;
    B. means for generating a random number sequence;
    C. a first storage means for storing the time and the random number sequence components of a generated identifier, the contents of said storage means being updated after each identifier is generated;
    D. a comparator for comparing the current time read from said clock and the time stored in said storage means;
    E. time adjusting means connected to receive the current time from said clock and responsive to the output of said comparator for adjusting the current time if the current time and the stored time are equal;
    F. sequence adjusting means connected to receive the random number sequence from said first storage means and responsive to the output of said comparator for adjusting said stored random number sequence if the current time is less than the stored time;
    G. node identifier means for storing the identifier of the node associated with the object;
    H. version number storage means for storing the version number of hardware or software used in generating the current identifier; and
    I. a second storage means responsive to the output of said time adjusting means and said sequence adjusting means, and the contents of said node identifier means and said version number storage means for storing said outputs and said contents as components of the current identifier wherein said current time represents days, months, years, hours, minutes, seconds and fractions of seconds.

7. A method for generating identifiers for objects in a computer system comprising the steps of:
    A. obtaining the current time;
    B. obtaining a random number sequence;
    C. comparing the current time with a previously generated identifier time component;
    D. adjusting the current time if the two times are equal to produce the current time component for the identifier;
    E. using the current time as the current time component of the identifier if the two times are not equal;
    F. adjusting said random number sequence if the current time is less than the previously generated identifier time component to produce a random number sequence component for the identifier;
    G. using said random number sequence as the random number sequence component of the identifier if the current time is not less than the previously generated identifier time component; and
    H. concatenating the current time component and the random number sequence component to form the identifier wherein said current time represents days, months, years, hours, minutes, seconds and fractions of seconds.

8. The method of claim 7, wherein said step of obtaining a random number of sequence comprises obtaining the sequence used in the previously generated identifier.

9. The method of claim 8, wherein said step of obtaining a random number sequence further comprises generating a new random number sequence if the random number sequence from the previously generated identifier cannot be obtained.

10. The method of claim 9, wherein said method further comprises the steps of:
    A. obtaining an identifier for a node associated with the object; and
    B. including the node identifier in the object identifier.

11. The method of claim 10, wherein said method further comprises the steps of:
   A. obtaining a version number associated with hardware or software used in generating the identifier; and
   B. including the number in the identifier.

12. A method for generating identifiers for objects in a computer system comprising the steps of:
   A. obtaining the current time;
   B. obtaining a random number sequence;
   C. comparing the current time with a previously generated identifier time component;
   D. adjusting the current time if the two times are equal to produce the current time component for the identifier;
   E. using the current time as the current time component of the identifier if the two times are not equal;
   F. adjusting said random number sequence if the current time is less than the previously generated identifier time component to produce a random number sequence component for the identifier;
   G. using said random number sequence as the random number sequence component of the identifier if the current time is not less than the previously generated identifier time component;
   H. obtaining an identifier for a node associated with the object;
   I. obtaining a number indicative of the present method, said number being updated whenever the process of completing each of the method steps is changed; and
   J. concatenating the current time component, the random number sequence component, the node identifier and the present method number to form the identifier wherein said current time represents days, months, years, hours, minutes, seconds and fractions of seconds.

13. The method of claim 12, wherein said step of obtaining a random number sequence comprises obtaining the sequence used in the previously generated identifier.

14. The method of claim 13, wherein said step of obtaining a random number sequence further comprises generating a new random number sequence if the random number sequence from the previously generated identifier cannot be obtained.

15. The method of claim 14, wherein said method further comprises a step of altering the random number sequence in a predetermined manner if the time from the previously generated identifier cannot be obtained.

* * * * *